United States Patent
Yang et al.

(10) Patent No.: US 7,778,446 B2
(45) Date of Patent: Aug. 17, 2010

(54) FAST HUMAN POSE ESTIMATION USING APPEARANCE AND MOTION VIA MULTI-DIMENSIONAL BOOSTING REGRESSION

(75) Inventors: Ming-Hsuan Yang, Mountain View, CA (US); Alessandro Bissacco, Los Angeles, CA (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/950,662

(22) Filed: Dec. 5, 2007

(65) Prior Publication Data
US 2008/0137956 A1   Jun. 12, 2008

Related U.S. Application Data

(60) Provisional application No. 60/868,830, filed on Dec. 6, 2006.

(51) Int. Cl.
*G06K 9/00* (2006.01)
(52) U.S. Cl. ........................ 382/103; 382/115
(58) Field of Classification Search ................ 382/118, 382/155, 160, 103
See application file for complete search history.

(56) References Cited

U.S. PATENT DOCUMENTS

| | | | |
|---|---|---|---|
| 5,404,167 A * | 4/1995 | Bist et al. | 375/240.11 |
| 6,009,210 A | 12/1999 | Kang | |
| 6,741,756 B1 | 5/2004 | Toyama et al. | |
| 7,095,878 B1 * | 8/2006 | Taylor et al. | 382/118 |
| 7,239,718 B2 * | 7/2007 | Park et al. | 382/103 |
| 2005/0058337 A1 * | 3/2005 | Fujimura et al. | 382/159 |
| 2006/0008138 A1 * | 1/2006 | Zhou et al. | 382/159 |
| 2006/0269145 A1 | 11/2006 | Roberts | |
| 2007/0071313 A1 * | 3/2007 | Zhou et al. | 382/155 |

OTHER PUBLICATIONS

Leo Breiman et al., *Classification and Regression Trees*, 1984, pp. 1-17, Wadsworth, Inc. U.S.A.
Jerome H. Friedman, *Greedy Function Approximation: A Gradient Boosting Machine*, [online], retrieved on May 9, 2008, Feb. 24, 1999, pp. 1-34, Retrieved from the URL:<http://www.salford-systems.com/doc/GreedyFuncApproxSS.pdf>.
Gregory Shakhnarovich et al., *Fast Pose Estimation with Parameter Sensitive Hashing*, [online], retrieved on May 9, 2008, pp. 1-8, Retrieved from the URL:<http://people.csail.mit.edu/gregory/papers/iccv2003.pdf>.

(Continued)

*Primary Examiner*—Brian Q Le
*Assistant Examiner*—Edward Park
(74) *Attorney, Agent, or Firm*—Fenwick & West LLP; Mark Duell

(57) ABSTRACT

Methods and systems are described for three-dimensional pose estimation. A training module determines a mapping function between a training image sequence and pose representations of a subject in the training image sequence. The training image sequence is represented by a set of appearance and motion patches. A set of filters are applied to the appearance and motion patches to extract features of the training images. Based on the extracted features, the training module learns a multidimensional mapping function that maps the motion and appearance patches to the pose representations of the subject. A testing module outputs a fast human pose estimation by applying the learned mapping function to a test image sequence.

20 Claims, 8 Drawing Sheets

OTHER PUBLICATIONS

C. Sminchisecu et al., *Human Pose Estimation from Silhouettes A Consistent Approach Using Distance Level Sets*, [online], retrieved on May 9, 2008, pp. 1-8, Retrieved from the URL:<http://www.win.tue.nl/~alext/ALEX/PAPERS/WSCG02/paper.pdf>.

Arasanathan Thayananthan, *Template-based Pose Estimation and Tracking of 3D Hand Motion*, 2005, [online], retrieved on May 9, 2008, pp. 1-154, Retrieved from the URL:<http://mi.eng.cam.ac.uk/~at315/thesis.pdf>.

Antonio Torralba et al., *Sharing features: efficient boosting procedures for multiclass object detection*, Proceedings of the 2004 IEEE Computer Society Conference on Computer Vision and Pattern Recognition (CVPR'04), 2004, pp. 1-8, IEEE.

Paul Viola et al., *Detecting Pedestrians Using Patterns of Motion and Appearance*, Proceedings of the Ninth IEEE International Conference on Computer Vision (ICCV'03), 2003, pp. 1-8, IEEE.

Shaohua Kevin Zhou et al., *Image Based Regression Using Boosting Method*, Proceedings of the Tenth IEEE International Conference on Computer Vision (ICCV'05) pp. 1-8, IEEE.

PCT International Search Report and Written Opinion, PCT/US2007/086458, Jul. 3, 2008.

* cited by examiner

FAST HUMAN POSE ESTIMATION USING APPEARANCE AND MOTION VIA MULTI-DIMENSIONAL BOOSTING REGRESSION

RELATED APPLICATIONS

This application claims priority from U.S. provisional application No. 60/868,830 entitled "Fast Human Pose Estimation Using Appearance and Motion via Multi-Dimensional Boosting Regression" filed on Dec. 6, 2006, the content of which is incorporated by reference herein in its entirety.

BACKGROUND

1. Field of Art

The invention generally relates to computer vision, and more specifically, to fast human pose estimation for motion tracking.

2. Description of the Related Art

An important problem in modern computer vision is full body tracking of humans in video sequences. Applications for human tracking including video surveillance, gesture analysis, human computer interface, and computer animation. For example, in creating a sports video game it may be desirable to track the three-dimensional (3D) motions of an athlete in order to realistically animate the game's characters. In biomedical applications, 3D motion tracking is important in analyzing and solving problems relating to the movement of human joints. In traditional 3D motion tracking, subjects wear suits with special markers and perform motions recorded by complex 3D capture systems. However, such motion capture systems are expensive due to the special equipment and significant studio time required. Furthermore, conventional 3D motion capture systems require considerable post-processing work which adds to the time and cost associated with traditional 3D tracking methods.

There have been significant efforts to solve the problem of tracking 3D human motion from a 2D input image sequence without the need for special markers on the subject or special motion capture equipment. However, the problem presents considerable challenges for several reasons. First, there exist multiple plausible solutions to any given input since 3D pose information is being extrapolated from 2D images. This is especially true in the presence of partial occlusions. Second, humans are articulated objects with a significant number of parts whose shape and appearance change in the images due to various nuisance factors such as illumination, clothing, viewpoint and pose. Third, the space of admissible solutions (i.e., all possible positions and orientations of all body parts) is extremely large, and the search for the optimal configuration in this space is a combinatorial problem that uses significant computational power to solve directly.

Due to the significant challenges presented by the human tracking problem, conventional trackers are inherently imperfect and conditions will exist where the tracker either provides an inaccurate estimate or loses track altogether. This is particularly true for fast motions, where the body limbs undergo large displacements from one frame to the next. In order to re-initialize the tracker when tracking is lost, a pose estimator is typically used to provide the tracker with an initial pose configuration from which tracking can begin.

However, estimating pose from a single image without any prior knowledge is in itself a challenging problem. In previous work, the problem has been cast as deterministic optimization, as inference over a generative model, as segmentation and grouping of image regions, or as a sampling problem. Previously proposed solutions either assume very restrictive appearance models or make use of cues, such as skin color and face position, which are not reliable and can be found only in specific classes of images (e.g. sport players or athletes). A large body of work in pose estimation focuses on the simpler problem of estimating the 3D pose from human body silhouettes. These approaches attempt to learn a map from silhouettes to poses, either direct, one-to-many or as a probabilistic mixture.

However, the conventional solutions each fail to provide a pose estimator that is both sufficiently accurate and sufficiently fast to be used effectively in real-time human tracking. Furthermore, conventional pose estimators fail to take advantage of both appearance and motion information provided by the input image sequence. Therefore, what is needed is an improved system and method for fast pose estimation using appearance and motion features.

SUMMARY

Methods and systems are disclosed for three-dimensional pose estimation of a subject in a two-dimensional image sequence. In a training stage, a training module determines a mapping function between an input image sequence and pose representations of a subject in the input image sequence. The training module receives a sequence of training images and a set of known poses of a subject in the images. The training module generates image representations of the sequence of training images. In one embodiment, the image representations comprise appearance patches representing the appearance of the subject and motion patches representing movement of the subject between image frames. Features are then extracted from the image representations. In one embodiment, the set of features comprise Haar-like features computed at a variety of orientations. Based on the extracted features in the sequence of training images, the training module learns a multidimensional regression function. The multidimensional regression function provides a mapping between the image representations and a multidimensional vector output corresponding to the known poses. In one embodiment, the multidimensional vector output comprises a vector of joint angles completely describing the pose.

In a testing stage, a testing module receives a test image sequence comprising a subject in unknown pose configurations. The learned mapping function from the training stage is applied to the received test image sequence. The learned mapping function outputs a multidimensional vector providing a pose estimation of the subject.

DETAILED DESCRIPTION

An embodiment of the present invention is now described with reference to the Figures where like reference numbers indicate identical or functionally similar elements. The present invention provides a fast body pose estimator for human tracking applications that estimates a three dimensional (3D) body pose from a two dimensional (2D) input image sequence. In a first embodiment, the pose estimator can be used to initialize a conventional tracking module, and re-initialize the tracker when tracking is lost. In another embodiment, the pose estimator can provide a pose estimation at each frame of the image sequence and the sequence of pose estimations itself can function as the tracker. In contrast to conventional pose estimators, the pose estimation module of the present invention is fast enough to run at every frame of a video and can be used for real-time tracking applications. Furthermore, the pose estimator operates with improved accuracy by exploiting both appearance and motion information from the image sequence.

Figure 1:
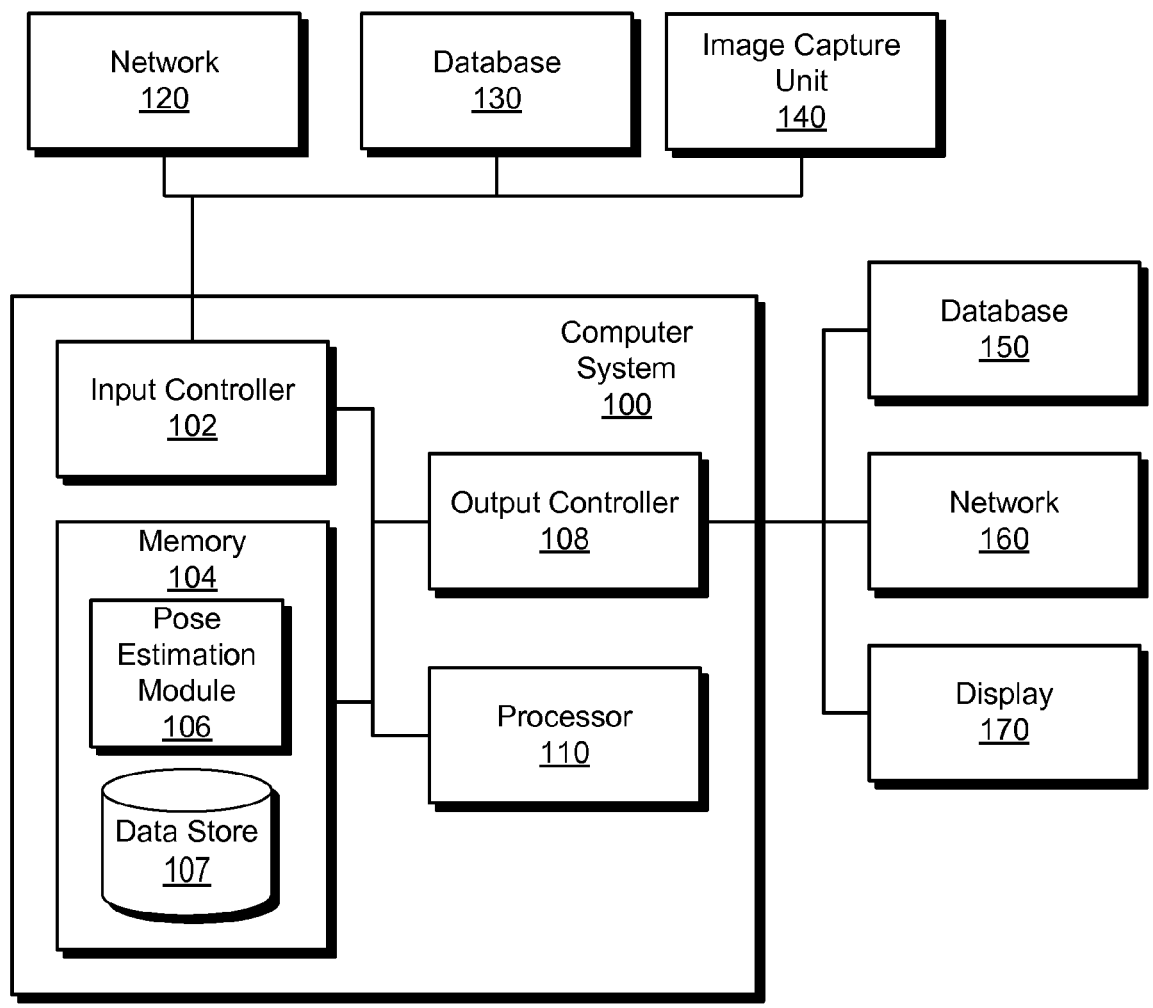
FIG. 1 is an example computer system in accordance with an embodiment of the present invention.

FIG. 1 is an illustration of a computer system 100 in which an embodiment of the present invention may operate. The computer system 100 includes a processor 110, an input controller 102, an output controller 108, and a memory 104.

The processor 110 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included. The processor 110 may comprises an arithmetic logic unit, a microprocessor, a general purpose computer, or some other information appliance equipped to transmit, receive and process electronic data signals from the memory 104, the input controller 102, or the output controller 108.

The input controller 102 is any device configured to provide input (e.g., a video input) to the computer system 100. In one embodiment, the input controller 102 is configured to receive an input image sequence from one or more of a network 120, a database 130, and an image capture unit 140 (e.g., a video camera). The output controller 108 represents any device equipped to output processed data to one or more of a database 150, a network 160, and a display 170 (e.g., an organic light emitting diode display (OLED), a liquid crystal display (LCD), or a cathode ray tube (CRT) display).

The memory 104 stores data and/or instructions that may be executed by processor 110. The instructions may comprise code for performing any and/or all of the techniques described herein. Memory 104 may be a dynamic random access memory (DRAM) device, a static random access memory (SRAM) device, Flash RAM (non-volatile storage), combinations of the above, or some other memory device known in the art. The memory 104 comprises a data store 107 and a pose estimation module 106, and is adapted to communicate with the processor 110, the input controller 102, and/or the output controller 108. The pose estimation module 106 comprises computer executable instructions for carrying out the pose estimation processes described below.

It should be apparent to one skilled in the art that computer system 100 may include more or less components than those shown in FIG. 1 without departing from the scope of the present invention. For example, computer system 100 may include additional memory, such as, for example, a first or second level cache, or one or more application specific integrated circuits (ASICs). Similarly, computer system 100 may include additional input or output devices.

Figure 2:
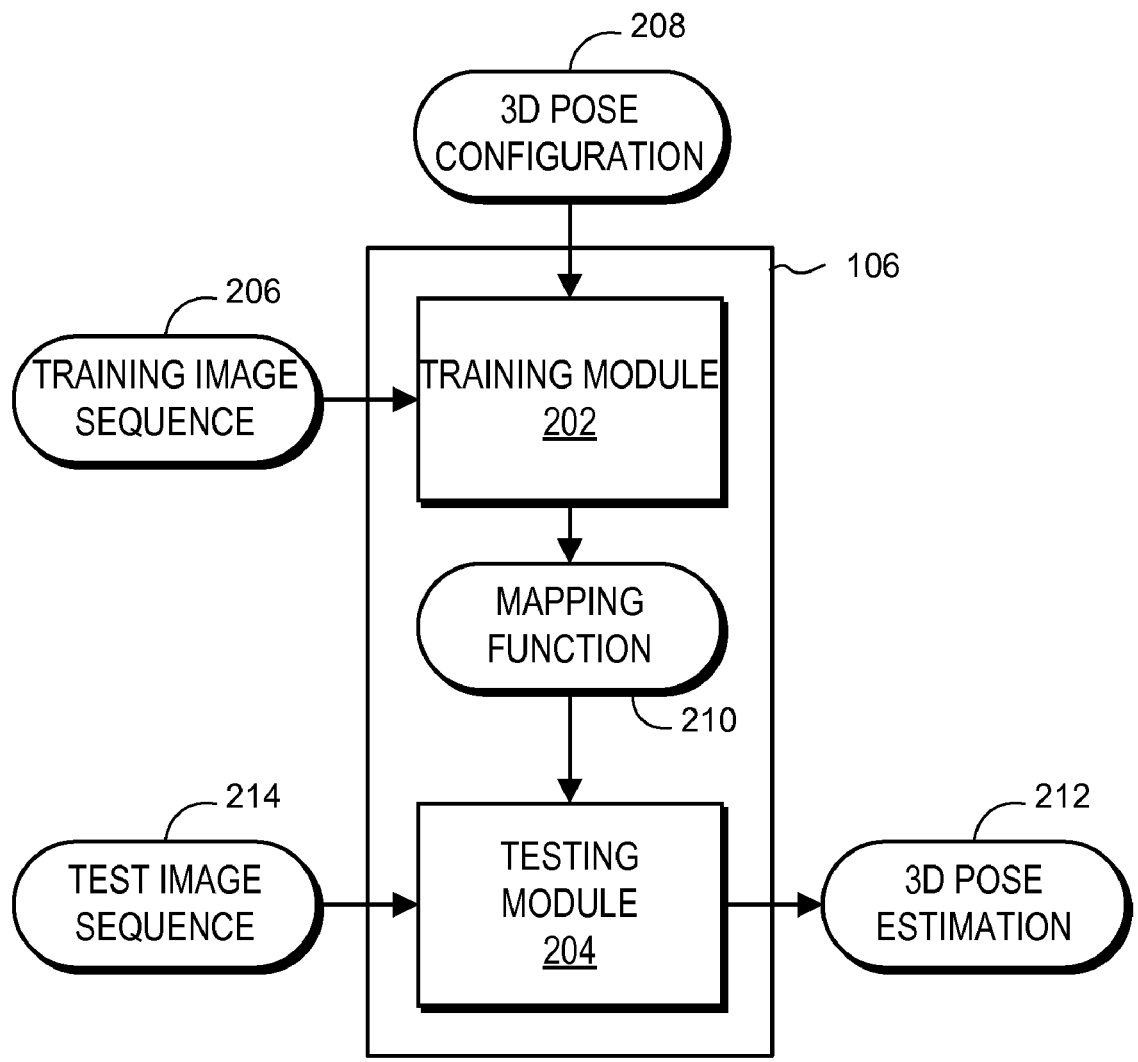
FIG. 2 is a block diagram illustrating an embodiment of a pose estimation module.

FIG. 2 is a high-level block diagram illustrating an embodiment of the pose estimation module 106. In one embodiment, the pose estimation module 106 comprises computer executable instructions that are executed by the processor 110 of the computer system 100. The pose estimation module 106 may further utilize data stored in data store 107 or data received by the input controller 102. Output data and intermediate data used by the pose estimation module 106 may be outputted by output controller 108 and/or stored in data store 107. As will be apparent to one of ordinary skill in the art, alternative embodiments of the pose estimation module 106 can be implemented in any combination of firmware, hardware, or software.

The pose estimation module 106 comprises a training module 202 and a testing module 204. The training module 202 receives a sequence of 2D training images from, for example, an external database 130, network 120, or image capture unit 140. The training images 206 contain humans having known pose configurations 208 that are also inputted to the training stage 202. The training images 206 may comprise, for example, walking sequences of one or more subjects, or any number of other common motions. The pose configurations 208 can comprise, for example, a vector of joint angles or any other set of information that completely describes the 3D pose. The pose configurations 208 may be obtained using any conventional 3D motion capture technique. Using the training image sequence 206 and the known pose configuration 208, the training module 202 learns a mapping function 210 that describes the relationship between the information in the training images 206 and the known 3D pose configurations 208. The training module 202 may operate on many different training image sequences 206 corresponding to different motions. In one embodiment, multiple mapping functions 210 are learned, with each mapping function 210 corresponding to a different type of motion. Typically, the training stage is executed in an offline mode so that the mapping function 210 is only learned once. Once the mapping function 210 is learned from the training images 206 and pose configurations 208, the mapping function 210 can be stored in data store 107 for use by the testing module 204.

The learned mapping function 210 is used by the testing module 204 to generate a sequence of 3D pose estimations 212 of a human subject that is detected in an input test image sequence 214. The testing module 204 receives the test image sequence 214 having humans in unknown pose configurations, applies the mapping function 210, and outputs the pose estimation 212. The pose estimation 212 comprises a multi-dimensional vector representation of the pose of a subject (e.g., a human) in the images. For example, the 3D pose estimations 212 may comprise a vector of joint angles describing the poses. The testing module 204 estimates the 3D pose 212 from the 2D test image sequence 214 without utilizing markers or special motion capture cameras. In one embodiment, the testing module 204 can operate fast enough to generate the pose estimations 212 in real-time as each test image in the test image sequence 214 is received. Thus, it is possible, for example, to provide a pose estimate at each frame of a video.

Figure 3:
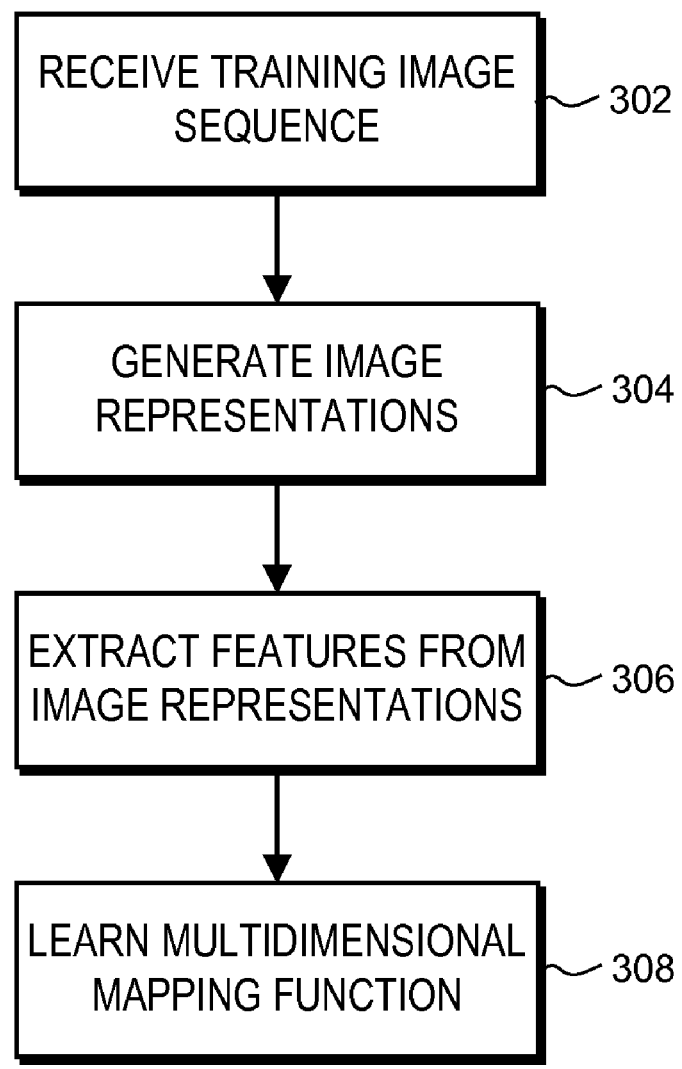
FIG. 3 is a flowchart illustrating an embodiment of a process for learning a mapping function for fast human pose estimation.

FIG. 3 is a flow diagram illustrating an embodiment of a process for learning a mapping function 210 for fast human pose estimation. The training module 202 receives 302 a training image sequence 206 and generates 304 image representations from the image sequence 206. In one embodiment, the image representations comprise motion and appearance patches derived from the training image sequence 206. An appearance patch comprises information from an image frame representing the appearance of a subject in the image frame. A motion patch comprises information representing movement of the subject between image frames. A process for generating motion and appearance patches is described in further detail below with reference to FIG. 4.

The training module 202 extracts 306 features from the image representations (e.g., motion and appearance patches). The features describe characteristics of the images such as for example, edges and/or lines at various orientations. A process for feature extraction is described in more detail below with reference to FIG. 5.

The training module 202 then learns 308 the mapping function 210. The mapping function 210 maps the image representations to the known body pose configurations 208 based in part on the extracted features. For example, in one embodiment, the mapping function 210 describes the relationship between an input vector of motion and appearance patches and a multidimensional vector of joint angles representing the pose. A process for learning 308 the mapping function 210 is described in more detail below with reference to FIG. 7.

Figure 4:
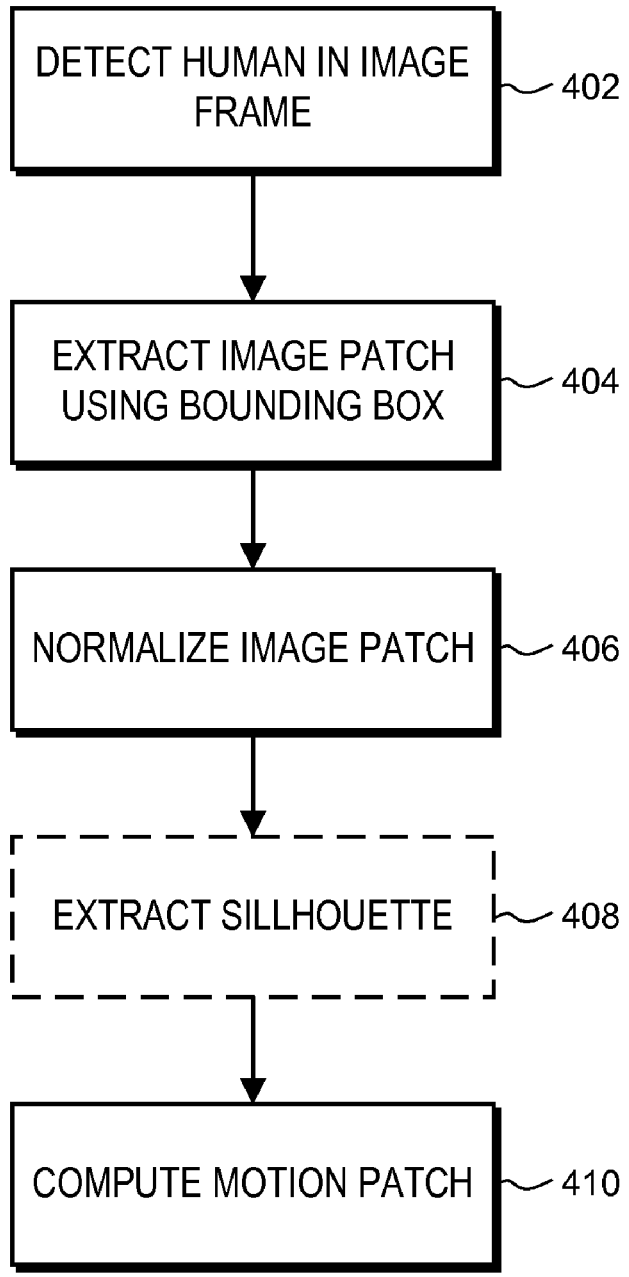
FIG. 4 is a flowchart illustrating an embodiment of a process for generating appearance and motion patches.

Referring now to FIG. 4, a flow diagram illustrates an embodiment of a process for generating 304 image representations of the training image sequence 206. The training module 202 first detects 402 a human in an image frame received from the training image sequence 206. Human detection processes are known in the art and an example process is described in more detail in P. Viola, et al., "*Detecting Pedestrians Using Patterns of Motion and Appearance*," ICCV, p. 734-741, 2003, the content of which is incorporated by reference herein in its entirety. The detection step 402 outputs a bounding box that bounds the detected human body in the image frame.

Using the bounding boxes, the process then extracts 404 an image patch containing the human body from the image frame. The patches can be normalized according to different variables such as, for example, intensity value and resolution (e.g., patches can be scaled to 64×64 pixels). The exact patch size can be chosen based on visual inspection and should ensure that the patch contains enough information for a human observer to distinguish between poses. Optionally, the silhouette of the human body can be extracted 408 using a background subtraction technique to mask out the background pixels. In some instances, this can improve learning speed and generalization performance. In other embodiments the step 408 is omitted. The result of steps 402-406 (and optionally 408) is an appearance patch denoted herein by $I_i$ representing the appearance of a human in an image frame. In one embodiment, the appearance patch, $I_i$ is represented by a 2D matrix of pixel intensity values. Alternatively, other representations may be used such as, for example, wavelet-based representations, Gabor filter representations, and the like.

Next, motion information is computed 410 from the appearance patches by computing the absolute difference of image values between adjacent frames. This information is denoted as an image patch $\Delta_i$ and is given by:

$$\Delta_i = \text{abs}(I_i - I_{i+1}) \quad (1)$$

In one embodiment, the direction of motion can be determined by taking the difference of the first image with a shifted version of the second using a technique similar to that described by Viola, et al., referenced above. For example, image patch $I_{i+1}$ can be shifted upward by one pixel and the difference between the shifted image patch $I_{i+1}$ and the previous image patch $I_i$ can be determined. Similarly, the image patch $I_{i+1}$ can be shifted leftward, rightward, or downward and compared to $I_i$. Based on the differences, the most likely direction of motion can be determined. In order to limit the number of features considered by the training module 202, this additional source of information can be optionally omitted.

In yet further embodiments, the motion patch $\Delta_i$ includes temporal information between more than two consecutive frames of video. Normalized appearance $I_i$ and motion $\Delta_i$ patches together form a input vector $x_i = \{I_i, \Delta_i\}$ to be used for extracting 306 features and learning 308 the mapping function 210.

A embodiment of a process for extracting features 306 from the appearance $I_i$ and motion $\Delta_i$ patches is next described. In one embodiment, Haar-like features are extracted from the images similar to the features described by Viola, et al., referenced above. Generally, Haar features are extracted by applying a set of filters to images that measure the difference between rectangular areas in the image with different size, position and aspect ratio. Advantageously, the features can be computed very efficiently from the integral image.

It is noted, however, that the Haar filters applied in Viola, et al. are used in detection of either faces or pedestrians and are not used for full body pose detection. In face or pedestrian detection, a small image patch of about 20 pixels per side is large enough to discriminate the object from the background. However, in the full body pose problem of the present invention, the use of higher resolution patches is desirable (e.g., 64×64 pixels). This prevents the description of limbs from being limited to an area of only a few pixels. By using higher resolution, the appearance is less sensitive to noise and results in higher performance. However, an increase in patch size also increases the number of basic Haar features that fit in the patch (approximately squared in its area) and increases the level of computation used in feature extraction. Thus, techniques are employed to reduce the computational burden of applying the Haar filters to large appearance and motion patches as described below.

Figure 5:
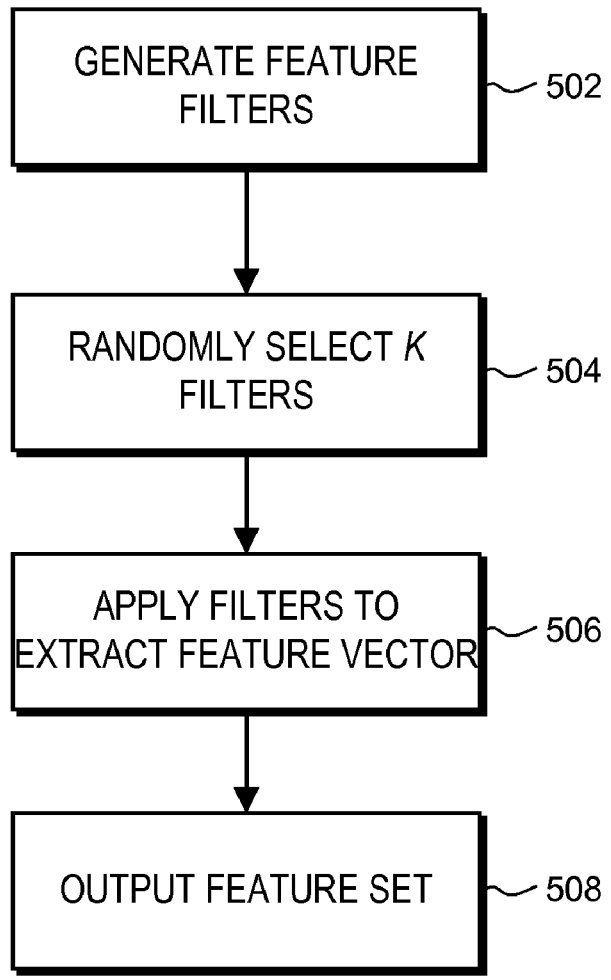
FIG. 5 is a flowchart illustrating an embodiment of a process for extracting features from the image representations.
Figure 6A:
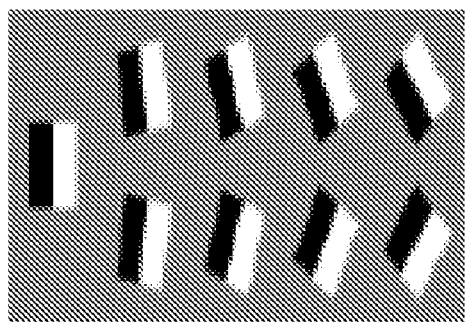
FIG. 6A-C illustrate examples of Haar features at a variety of orientations.
Figure 6B:
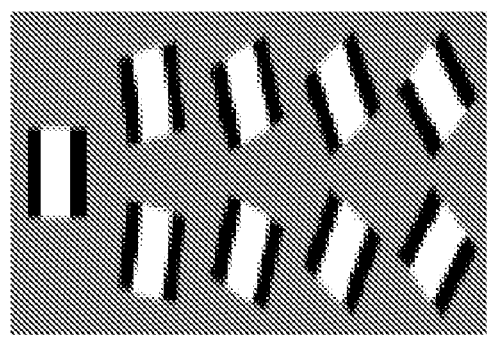
Figure 6C:
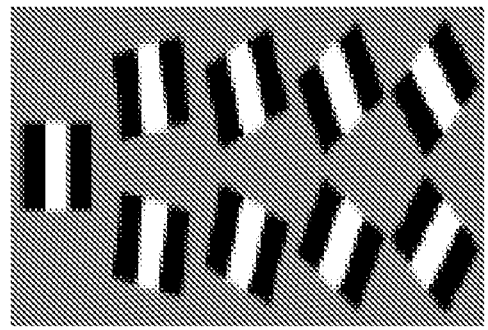

Turning now to FIG. 5, a process for feature extraction 306 is illustrated in accordance with an embodiment of the present invention. In one embodiment, the process uses a set of differential filters tailored to the human body to extract temporal and spatial information from the images. A large pool of features is created for use in a boosting process that learns the mapping function 210 from image frames to the 3D pose estimations. First, the set of filters are generated 502. The process extends the set of basic vertical Haar features by introducing rotated versions computed at a few major orientations as illustrated in FIGS. 6A-C. This allows the features to isolate limbs having any arbitrary orientation. For example, in one embodiment, one type of edge feature (FIG. 6A) and two types of lines features (FIG. 6B and FIG. 6C) are used where each feature can assume any of 18 equally spaced orientations in the range $[0, \pi]$. The features in FIG. 6C, for example, are suitable to match body limbs, while the features in 6A and 6B are suitable to match trunk, head, and full body. The features can have any position inside the patch.

To reduce the computational burden of a large feature set, one embodiment selects a subset of filters from the full set of filters applied for feature extraction. For example, each rectangle of the filter set can be restricted to have a minimum area (e.g., 80 pixels) and/or can be restricted in their distance from the border (e.g., rectangles not closer than 8 pixels from the border). In addition, rectangles can be limited to those having even width and even height. To even further limit the number filters, a number K filters from the filter set are randomly selected 504 by uniform sampling. Next, the set of filters are applied 506 to the appearance and motion patches to extract features. Using this approach, oriented features can be extracted very efficiently from integral images computed on rotated versions of the image patch. The process outputs 508 a set of K features per image. Thus, each image i is represented by a vector having elements, $f^k(x_i)\}_{k=1,\ldots,K}$ that map motion and appearance patches $x_i = \{I_i, \Delta_i\}$ to real values.

An embodiment of a process for learning 308 the multidimensional mapping function 210 is now described. A boosting regression process provides a way to automatically select from the large pool of features the most informative ones to be used as basic elements for building the mapping function 210. Examples of boosting regression techniques are described in J. H. Friedman, "*Greedy Function Approximation: A Gradient Boosting Machine*," Annals of Statistics, 29:1189-1232, 2001. 3,4; A. Torralba, "*Sharing Features: Efficient Boosting Procedures for Multiclass Object Detection*," CVPR, 2004; and S. K. Zhou, et al., "*Image Based Regression Using Boosting Method.*", ICCV, 2005, the contents of which are all incorporated by reference in their entirety.

A basic Gradient Treeboost process is now described and the extension to multidimensional mappings is derived. Given a training set $\{y_i, x_i\}_1^N$, with inputs $x_i \in \Re^n$ and outputs $y_i \in \Re$ independent samples from some underlying joint distribution, the regression process determines a function $F^*(x)$ that maps x to y, such that the expected value of a loss function $E_{x,y}[\psi(y, F(x))]$ is minimized. It is noted that in the conventional process, the derived function, $F^*(x)$ maps a vector input x to a scalar output y. Thus, in order to determine the full vector of joint angles, a different mapping function is learned and applied for each joint angle. Typically, the expected loss is approximated by its empirical estimate and the regression problem can be written as:

$$F^*(x) = \underset{F(x)}{\operatorname{argmin}} \sum_{i=1}^{N} \Psi(y_i, F(x_i)) \qquad (2)$$

Regularization can be imposed by assuming an additive expansion for F(x) with basic functions h:

$$F(x) = \sum_{m=0}^{M} h(x; \mathcal{A}_m, \mathcal{R}_m) \qquad (3)$$

where $$h(x; A_m, R_m) = \sum_{l=1}^{L} a_{lm} 1(x \in R_{lm})$$

are piecewise constant functions of x with values $A_m = \{a_{1m}, \ldots, a_{Lm}\}$ and input space partition $R_m = \{R_{1m}, \ldots, R_{Lm}\}$, and where 1(c) denotes the function that is 1 if condition c is true, and is 0 otherwise. L denotes the number of partitions, or regions. For L=2, for example, the basic functions h are decision stumps, which assume one of two values according to the response of a feature $f^{km}(x)$ compared to a given threshold $\theta_m$. In general h is a L-terminal node Classification and Regression Tree (CART) where internal node splits the partition associated to the parent node by comparing a feature response to a threshold, and the leaves describe the final values $A_m$. CART is described in further detail in L. Brieman, et al., "*Classification and Regression Trees*," Wadsworth & Brooks, 1984, 4, 6, 8, the content of which is incorporated by reference herein in its entirety. Eq. (2) can be solved by a greedy stagewise approach where at each step m the parameters of the basic function $h(x; A_m, R_m)$ are determined that maximally decreases the loss function:

$$\mathcal{A}_m, \mathcal{R}_m = \underset{\mathcal{A}, \mathcal{R}}{\operatorname{argmin}} \sum_{i=1}^{N} \Psi(y_i, F_{m-1}(x_i) + h(x_i; \mathcal{A}, \mathcal{R})) \qquad (4)$$

Since the basic learner h is a piecewise-constant function, solving the above equation by gradient descent on the parameters is complex: the partial derivatives of h with respect to $R_{lm}$ are Dirac deltas. Gradient Treeboost is an efficient approximate minimization scheme solving Eq. (2) with a two step approach. Gradient Treeboost is described in more detail by J. H. Friedman, referenced above. At each stage m the Gradient Treeboost process uses the previous estimate $F_{m-1}$ to compute the "pseudo-residuals":

$$\tilde{y}_{lm} = -\left[\frac{\partial \psi(y_i, F(x_i))}{\partial F(x_i)}\right]_{F(x) = F_{m-1}(x)} \qquad (5)$$

First the process finds the input space partition $R_m$ (a L-node regression tree) by least-squares fitting the basic learner h(x; A, R) to the pseudo residuals:

$$\tilde{\mathcal{A}}_m, \mathcal{R}_m = \underset{\mathcal{A}, \mathcal{R}}{\operatorname{argmin}} \sum_{i=1}^{N} |\tilde{y}_{im} - h(x_i; \mathcal{A}, \mathcal{R})|^2 \qquad (6)$$

When the basic learners h are decision stumps constructed from a pool of K features, the solution to Eq. (6) is found by estimating for each feature $f^{km}$ the threshold $\theta_m$ and approximating values $a_{1m}, a_{2m}$ minimizing Eq. (6), and picking the one with the lowest error. This step is equivalent to solving Eq. (5) assuming least-squares loss $\Psi(y, x) = |y - x|^2$. Then the process computes the regression tree values $A_m$ by optimizing the original loss function $\Psi(y, F(x))$ within each partition $R_{lm}$, i.e. by finding the constant offset $a_{lm}$ to the previous approximation $F_{m-1}$ that best fits the measurements:

$$a_{lm} = \underset{a}{\operatorname{argmin}} \sum_{i=1}^{N} \Psi(y_i, F_{m-1}(x_i) + a) 1(x_i \in R_{lm}) \qquad (7)$$

The pseudo residuals $\tilde{y}_{im}$ and the tree predictions $a_{lm}$ depend on the choice of the loss criterion $\Psi$.

In the case of Least Squares (LS) $\Psi(y, F(x)) = |y - F(x)|^2$, the pseudo residuals are just the current residuals:

$$\tilde{y}_{im} = y_i - F_{m-1}(x_i) \qquad (8)$$

Both the input partition R and the function values A are computed in Eq. (6). In this case the Gradient Tree-Boost algorithm reduces to Eq. (5).

Using Least-Absolute-Deviation (LAD or $L_1$ error), $\Psi(y, F(x))=|y-F(x)|$ gives:

$$\tilde{y}_{im} = \text{sign}(y_i - F_{m-1}(x_i))$$

$$a_{lm} = \text{median}_{i:x_i \in R_{lm}} \{y_i - F_{m-1}(x_i)\} \qquad (9)$$

In one embodiment of the Gradient TreeBoost process, the estimated regression tree is scaled by a shrinkage parameter $0 \leq v \leq 1$, (e.g., $v=0.5$) before updating the current approximation, where $v$ controls the learning rate (smaller values lead to better generalization):

$$F_m(x) = F_{m-1}(x) + v \sum_{l=1}^{L} a_{lm} 1(x \in R_{lm}) \qquad (10)$$

In one embodiment, the regions are defined by thresholds $\theta$ on filter responses $f^k(x)$, where $f^k$ is the k-th Haar filter computed on the appearance and motion patches $x=\{I, \Delta\}$. For the case of degenerate regression trees with a single node (decision stumps), the following equation applies:

$$h_s(x; a_{1m}, a_{2m}, k_m, \theta_m) = \begin{cases} a_{1m} & \text{if } f^{k_m}(x) \leq \theta_m \\ a_{2m} & \text{if } f^{k_m}(x) > \theta_m \end{cases} \qquad (11)$$

As can be observed, $h_s$ is a special case of the basic learner $h$ described above with $L=2$ and regions defined by thresholds $\theta$ on filter responses $f^k(x)$.

It is noted that that the basic learners, $h_s$, described above are more general than the ones proposed by Zhou, et al., referenced above, since there is no constraint that $a_{2m}=-a_{1m}$. Additionally, while Zhou is restricted to decision stumps as basic functions, the boosting framework of the present invention supports general regression trees Next an extension to the Gradient TreeBoost process described above is provided in order to efficiently handle multidimensional maps in accordance with an embodiment of the present invention. Given a training set $\{y_i, x_i\}_1^N$ with vector inputs $x_i \in \mathfrak{R}^n$ and vector outputs $y_i \in \mathfrak{R}^p$, the method determines the function $F(x): \mathfrak{R}^n \rightarrow \mathfrak{R}^p$ minimizing the loss $\Psi(y, F(x))$. In the application to pose estimation, for example, p represents the number of joints angles. In one embodiment, the number of joint angles is given by the number of joints multiplied by 3, as each joint is represented by a set of 3 angles. The input $x_i$ is the normalized appearance and motion patches previously derived from the training image sequence 206. The output $y_i$ is the vector of known pose configurations 208 corresponding to the image sequence 206 and may be, for example, a vector of joint angles describing the poses. In contrast to conventional techniques, it is noted that both the input $x_i$ and output $y_i$ are vectors. Thus, the function can provide the complete vector of joint angles for a given input rather than using multiple mapping functions to derive the joint angles. The Multidimensional Treeboost process assumes that the mapping function, $F(x)$, can be expressed as a sum of basic piecewise constant (vector) functions:

$$F(x) = \sum_{m=0}^{M} h(x; \{\mathcal{A}_m^1, \ldots, \mathcal{A}_m^p\}, R_m) = \begin{bmatrix} \sum_{m=0}^{M} h(x; \mathcal{A}_m^1, R_m) \\ \ldots \\ \sum_{m=0}^{M} h(x; \mathcal{A}_m^p, R_m) \end{bmatrix} \qquad (12)$$

The process determines a mapping function, $F(x)$ that minimizing the expected value of the loss function, $E_{y,x}=\Psi(y, F(x))$. Notice that Eq. (12) differs from applying the expansion in Eq. (3) to each element in the vector map $F(x)$ in that it restricts all the basic functions $h_i(x)=h(x; A^i, R^i)$ to share the same input space partition: $R^i=R$. For pose estimation applications, this translates into the joint angle regressors sharing the same set of features, thereby substantially improving the efficiency of the representation.

Figure 7:
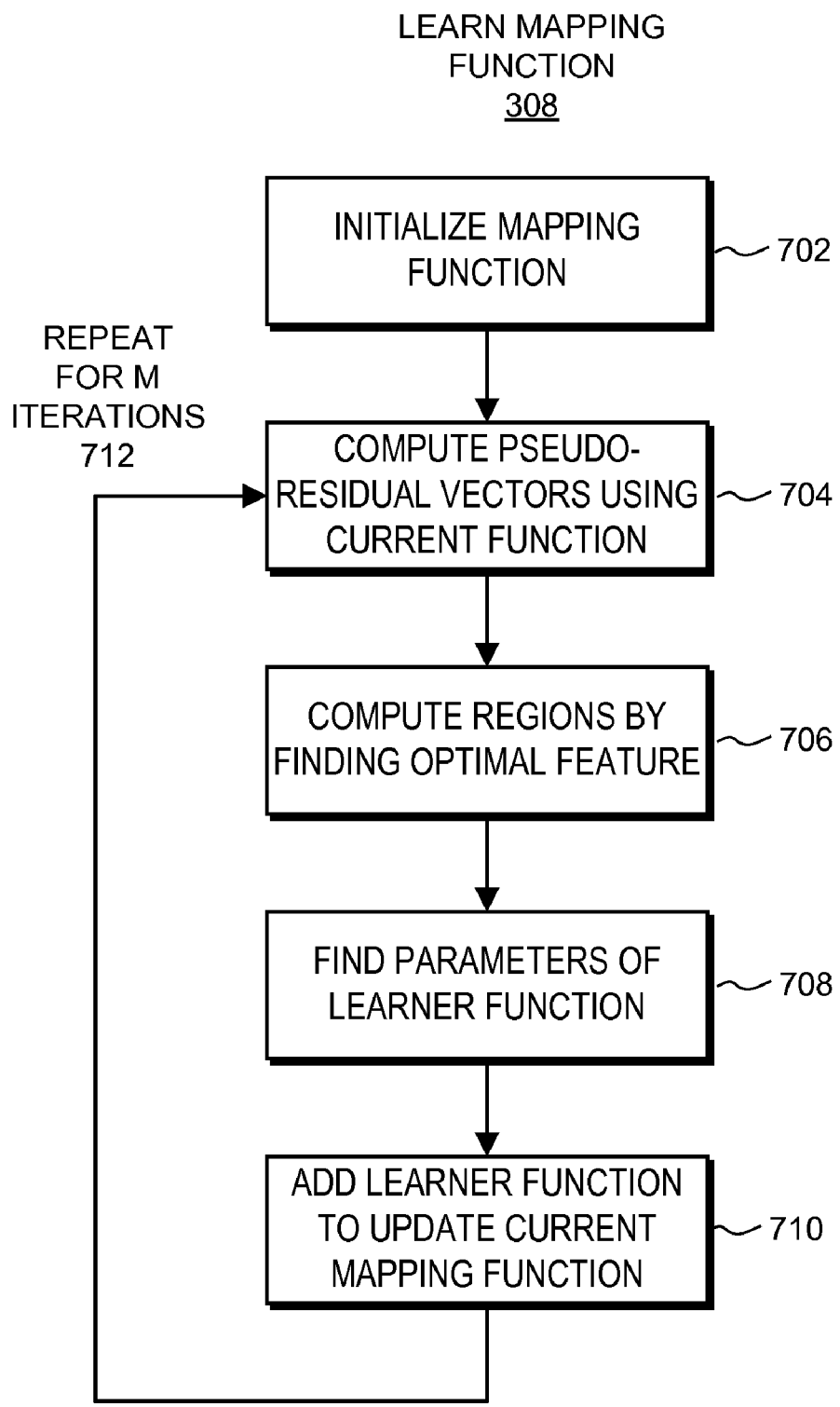
FIG. 7 is a flowchart illustrating an embodiment of a process for learning a mapping function.

Using decision stumps on Haar feature responses as basic learners, a process for Multidimensional Gradient Treeboost is illustrated in FIG. 7 and described below in accordance with an embodiment of the present invention. The process can be implemented using, for example, Least Squares (LS) or Least Absolute Deviation (LAD) as loss functions.

The described process derives the mapping function 210 using an iterative approach. In each iteration, the process updates the mapping function 210 until a stopping criterion is reached. In the description below, the mapping function derived by the $m^{th}$ iteration will be denoted by $F_m(x)$.

The process first initializes 702 the mapping function 210 to a constant function $F_0(x)$ that minimizes the loss function, $\Psi(y, F(x))$. If an LS loss function is used, the constant function $F_0(x)$ is initialized to the mean of the training outputs $y_i$ (i.e. the known pose configuration 208). If an LAD loss function is used, the constant function $F_0(x)$ is initialized to the median of the training outputs $y_i$:

$$F_0(x) = \begin{cases} \text{mean}\{y_i\} i=1, \ldots, N & LS \\ \text{median}\{y_i\} i=1, \ldots, N & LAD \end{cases} \qquad (13)$$

The training module 202 then computes 704 the pseudo-residual vectors, $\tilde{y}_{im}$. If an LS loss function is used, the pseudo-residuals are computed 704 from the training residuals $y_i - F_{m-1}(x_i)$. If an LAD loss function is used, the pseudo-residuals are computed from the signs of the training residuals:

$$\tilde{y}_{im} = (\tilde{y}_{im}^1, \ldots, \tilde{y}_{im}^p) = \begin{cases} y_i - F_{m-1}(x_t), & i=1, \ldots, N \quad LS \\ \tilde{y}_{im} = \text{sign}(y_i - F_{m-1}(x_i)) & LAD \end{cases} \qquad (14)$$

The pseudo-residuals describe an error between the known pose configuration 208 and the output of the current mapping function $F_{m-1}(x)$ (i.e. the mapping function derived in the previous iteration) applied to the training input 206. The regions $R_{lm}$ are computed 706 by finding the optimal feature $k_m$ and associated threshold value $\theta_m$ $$k_m, \theta_m = \operatorname{argmin}_{k,\theta} \sum_{j=1}^{p} \min_{a_1, a_2} \sum_{i=1}^{N} (\tilde{y}_{im}^j - h_s(x_i; a_1, a_2, k, \theta))^2 \qquad (15)$$

In one embodiment, the input space is partitioned into regions $R_{lm}$ using decision trees or decision stumps. The decision trees (and stumps) partition input vectors into several regions (i.e., areas). These regions can in turn be further partitioned using stumps or information can be gathered at the leaf nodes. For every feature $f^k$, the least-squares approximation errors to the pseudo-residuals $\tilde{y}_{im}$ is computed using p vector stumps $h_s$ whose inputs are the filter responses $f^k(x_i)$, and the feature with the lowest error is chosen. Notice that the least-squares criterion allows for efficiently finding the values $a_i$, since the mean of the outputs is only incrementally computed sorted by feature value while searching for the optimal threshold, $\theta_m$.

Eq. 16 finds 708 the two vector parameters $a_1$, $a_2$ of the basic stump learner $h_s$, which are the constant predictions of the residuals in the two regions found in the previous step 706.

$$a_{1m}, a_{2m} = \begin{cases} \operatorname{mean} \{y_i - F_{m-1}(x_i)\}_{i: f^k(x_i) < \theta}, & \operatorname{mean} \{y_i - F_{m-1}(x_i)\}_{i: f^k(x_i) \geq \theta} & LS \\ \operatorname{median} \{y_i - F_{m-1}(x_i)\}_{i: f^k(x_i) < \theta}, & \operatorname{median} \{y_i - F_{m-1}(x_i)\}_{i: f^k(x_i) < \theta} & LAD \end{cases} \qquad (16)$$

If an LS loss function is used, the parameters $a_1$, $a_2$ are computed as the mean of the sample residuals in each region. If an LAD loss function is used, the parameters $a_1$, $a_2$ are computed as the medians of the sample residuals. The stump learner function $h_s$ is then added 710 to the current mapping function, $F_{m-1}(x)$, and scaled by the learning rate v to compute the updated mapping function $F_m(x)$:

$$F_m(x) = F_{m-1}(x) + v h_s(x: a_{1m}, a_{2m}, k_m, \theta_m) \qquad (17)$$

The process repeats 712 for M iterations. In one embodiment, M is a predetermined constant. In another embodiment, M is the number of iterations until the changes to the pseudo-residuals, $\tilde{y}_{im}$, becomes negligible.

It is noted that the process of FIG. 7 is not limited to stumps but can be formulated for arbitrary decision trees. For example, Classification and Regression Trees (CART) can be applied as basic functions h(x). These are decision trees modeling a piecewise constant function, where each node of the tree uses a feature $f^k$ and a threshold $\theta$ to recursively split the current region of the input space in two, and the terminal leaves define the input space partition $R_{lm}$.

The disclosed method advantageously provides a gradient boosting technique that derives a multidimensional regression function. Instead of learning a separate regression function for each joint angle, a vector function is learned that maps features to sets of joint angles representing full body poses. One advantage of learning multidimensional maps is that it allows the joint angle estimators to share the same set of features. This is beneficial because of the high degree of correlation between joint angles for natural human poses. The resulting pose estimator is sensibly faster than the collection of scalar counterparts, since it uses a number of features which grows with the effective dimension of the target space instead of with the number of joint angles. The described embodiments are well suited to fit multidimensional maps having components at different scales, and can be extended to include more complex basic functions such as regression trees.

Figure 8:
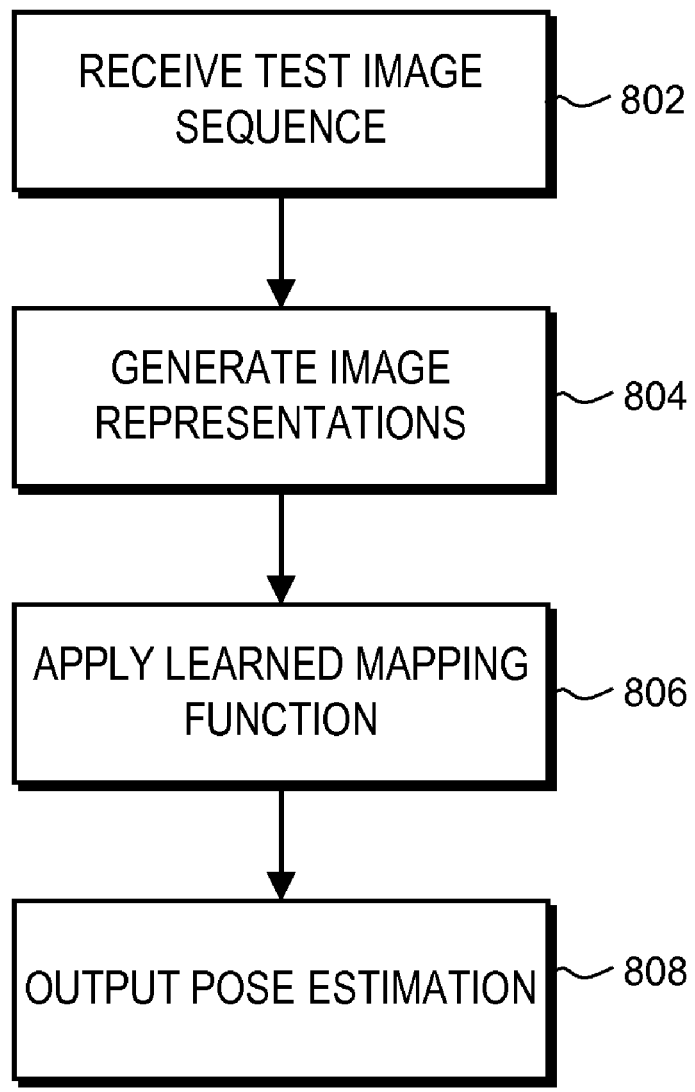
FIG. 8 is a flowchart illustrating an embodiment of a process for fast human pose estimation of a test image sequence.

Referring next to FIG. 8, an embodiment of a process for fast human pose estimation is illustrated. The testing module 204 receives 802 an input test image 214 and generates 804 image representations of the test images. In one embodiment, the image representations comprise motion and appearance patches generated according to the process of FIG. 4 described above. The learned mapping function 210 is then applied 806 to the image representations. The mapping function 210 outputs 308 a pose estimation comprising, for example, a vector of joint angles describing the pose of a subject in the test image 214. Advantageously, application of the mapping function 210 generates a vector output completely describing the pose. In one embodiment, the testing module executes the process of FIG. 8 quickly enough to provide pose estimations at every frame of an input video having a standard frame rate (e.g., 30 frames/second).

Reference in the specification to "one embodiment" or to "an embodiment" means that a particular feature, structure or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The invention claimed is:

1. A method for determining a mapping function for body pose estimation, the method comprising:
   using a computer processor to perform steps of:
   receiving a two-dimensional training image sequence of a moving subject, and a corresponding sequence of three-dimensional body pose representations of the moving subject;
   determining a set of appearance patches and motion patches for each of the two-dimensional training images in the training image sequence, the appearance patches representing an appearance of the moving subject in the training image sequence, and the motion patches representing movement of the subject between image frames of the training image sequence;
   extracting features from the appearance patches and the motion patches; and
   applying a multidimensional boosting regression to the appearance patches and the motion patches to derive the mapping function, the mapping function mapping each set of appearance and motion patches of the two-dimensional training images to a three-dimensional body pose representation of the subject, wherein the multidimensional boosting regression is based at least in part on the extracted features, and wherein applying the multidimensional boosting regression comprises:
   initializing the mapping function to an initial value;
   computing pseudo-residuals representing a difference between pose representations of the subject and a result of the mapping function applied to the training image sequence;
   determining an optimal feature from a set of features and an optimal threshold value based on the computed pseudo-residuals;
   determining parameters of a learner function using the optimal feature and threshold; and
   combining the learner function with the mapping function to update the mapping function.

2. The method of claim 1, further comprising storing the mapping function to a storage medium.

3. The method of claim 1, wherein determining the appearance patches comprises:
   detecting the subject in an image frame of the training image sequence; and
   extracting a portion of the image frame bounding the detected subject.

4. The method of claim 3, wherein determining the appearance patches further comprises:
   normalizing the extracted portion of the image frame according to a normalization parameter.

5. The method of claim 1, wherein determining the motion patches comprises:
   computing a difference of image values between a first appearance patch extracted from a first image frame and a second appearance patch extracted from a second image frame.

6. The method of claim 1, wherein extracting features from the image representations comprises:
   generating a set of feature filters;
   randomly selecting a subset of features filters from the set of feature filters;
   applying the subset of filters to the image representations; and
   outputting features resulting from the application of the subset of filters.

7. The method of claim 6, wherein the set of feature filters comprise Haar filters having a plurality of orientations.

8. The method of claim 1, wherein initializing the mapping function comprises setting the mapping function to a constant value comprising an average of the pose representations.

9. The method of claim 1, wherein determining the parameters of the learner function comprises:
   determining a first set of images and a second set of images from the training image sequence based on the optimal feature and the optimal threshold;
   determining a first parameter representing an average of residuals computed in a first region, the first region corresponding to the first set of images; and
   determining a second parameter representing an average of residuals computed in a second region, the second region corresponding to the second set of images.

10. The method of claim 1, wherein combining the learner function with the mapping function comprises:
    scaling the learner function by a learning rate; and
    adding the scaled learner function to the mapping function.

11. A method for fast human body pose estimation comprising:

using a computer processor to perform steps of:
receiving a two-dimensional test image sequence of a moving subject;
determining a set of appearance patches and motion patches from the two-dimensional test-image sequence, the appearance patches representing an appearance of the moving subject in the test image sequence, and the motion patches representing movement of the subject between image frames of the test image sequence;
applying a learned mapping function to the appearance and motion patches to map each set of appearance and motion patches of the two-dimensional test images to a multidimensional output comprising a three-dimensional body pose representation of the moving subject in the test image sequence, wherein the learned mapping is derived from a multidimensional boosting regression performed on a training image sequence, and wherein the multidimensional boosting regression is based at least in part on extracted features of the training image sequence, the learned mapping function derived by applying steps of:
initializing the mapping function to an initial value;
computing pseudo-residuals representing a difference between pose representations of the subject and a result of the mapping function applied to the training image sequence;
determining an optimal feature from a set of features and an optimal threshold value based on the computed pseudo-residuals;
determining parameters of a learner function using the optimal feature and threshold; and
combining the learner function with the mapping function to update the mapping function; and
outputting a body pose estimation resulting from applying the learned mapping function to the appearance and motion patches representing the test image representation.

12. The method of claim 11, wherein determining the motion patches comprises:
computing a difference of image values between a first appearance patch extracted from a first image frame and a second appearance patch extracted from a second image frame.

13. The method of claim 11, wherein the extracted features are derived according to a process comprising the steps of:
generating a set of feature filters;
randomly selecting a subset of features filters from the set of feature filters;
applying the subset of filters to the image representations; and
outputting features resulting from the application of the subset of filters.

14. A computer program product comprising a non-transitory computer readable medium storing computer executable code for determining a mapping function for body pose estimation, the computer executable code when executed performing the steps of: receiving a two-dimensional training image sequence of a moving subject, and a corresponding sequence of three-dimensional body pose representations of the moving subject;
determining a set of appearance patches and motion patches for each of the two-dimensional training images in the training image sequence, the appearance patches representing an appearance of the moving subject in the training image sequence, and the motion patches representing movement of the subject between image frames of the training image sequence;
extracting features from the appearance patches and the motion patches; and applying a multidimensional boosting regression to the appearance patches and the motion patches to derive the mapping function, the mapping function mapping, each set of appearance and motion patches of the two-dimensional training images to a three-dimensional body pose representation of the subject, wherein the multidimensional boosting regression is based at least in part on the extracted features, and wherein applying the multidimensional boosting regression comprises: initializing the mapping function to an initial value;
computing pseudo-residuals representing a difference between pose representations of the subject and a result of the mapping function applied to the training image sequence;
determining an optimal feature from a set of features and an optimal threshold value based on the computed pseudo-residuals;
determining parameters of a learner function using the optimal feature and threshold; and
combining the learner function with the mapping function to update the mapping function.

15. The computer program product of claim 14, the computer executable code when executed further performing the step of storing the mapping function to a storage medium.

16. The computer program product of claim 14, wherein determining the motion patches comprises:
computing a difference of image values between a first appearance patch extracted from a first image frame and a second appearance patch extracted from a second image frame.

17. The computer program product of claim 14, wherein extracting features from the image representations comprises:
generating a set of feature filters;
randomly selecting a subset of features filters from the set of feature filters;
applying the subset of filters to the image representations; and
outputting features resulting from the application of the subset of filters.

18. A system for determining a mapping function for body pose estimation, the system comprising:
an input controller adapted to receive a two-dimensional training image sequence of a moving subject, and a corresponding sequence of three-dimensional body pose representations of the moving subject;
a processor; and
a computer-readable storage medium storing a training module executable by the processor, the training module adapted to determine a set of appearance patches and motion patches for each of the two-dimensional training images in the training image sequence, the appearance patches representing an appearance of the moving subject in the training image sequence, and the motion patches representing movement of the subject between image frames of the training image sequence, extract features from the appearance patches and the motion patches, and apply a multidimensional boosting regression to the appearance patches and the motion patches to derive the mapping function, the mapping function mapping each set of appearance and motion patches of the two-dimensional training images to a three-dimensional body pose representation of the subject, wherein the multidimensional boosting regression is based at least in part on the extracted features, and wherein the training module is further adapted to initialize the mapping function to an initial value, compute pseudo-residuals representing a difference between pose representations of the subject and a result of the mapping function applied to the training image sequence determine an optimal feature from a set of features and an optimal threshold value based on the computed pseudo-residuals, determine parameters of a learner function using the optimal feature and threshold, and combine the learner function with the mapping function to update the mapping function.

19. The system of claim 18, wherein determining motion patches comprises:

computing a difference of image values between a first appearance patch extracted from a first image frame and a second appearance patch extracted from a second image frame.

20. The system of claim 18, wherein the training module is further adapted to generate a set of feature filters, randomly select a subset of features filters from the set of feature filters, apply the subset of filters to the image representations, and output features resulting from the application of the subset of filters.

* * * * *